US008832272B2

(12) United States Patent
Ueno

(10) Patent No.: US 8,832,272 B2
(45) Date of Patent: Sep. 9, 2014

(54) NETWORK SYSTEM, CONTROL METHOD FOR THE SAME, AND CONTROLLER, USING TARGETED RELAY PROCESSING DEVICES

(75) Inventor: Hiroshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 6 days.

(21) Appl. No.: 13/200,755

(22) Filed: Sep. 30, 2011

(65) Prior Publication Data

US 2012/0023231 A1 Jan. 26, 2012

Related U.S. Application Data

(63) Continuation of application No. PCT/JP2010/068504, filed on Oct. 20, 2010.

(30) Foreign Application Priority Data

Oct. 23, 2009 (JP) ................................. 2009-244872

(51) Int. Cl.
*G06F 15/173* (2006.01)

(52) U.S. Cl.
USPC ......................................... 709/225; 370/351

(58) Field of Classification Search
USPC .......... 709/220, 241, 242; 370/352, 389, 399, 370/412; 718/105
See application file for complete search history.

(56) References Cited

U.S. PATENT DOCUMENTS

| 6,601,084 | B1* | 7/2003 | Bhaskaran et al. | 718/105 |
| 7,055,173 | B1* | 5/2006 | Chaganty et al. | 726/11 |
| 2003/0108052 | A1* | 6/2003 | Inoue et al. | 370/399 |
| 2003/0145109 | A1* | 7/2003 | Nakashima | 709/241 |
| 2004/0068580 | A1* | 4/2004 | Jo et al. | 709/242 |
| 2004/0076154 | A1* | 4/2004 | Mizutani et al. | 370/389 |
| 2005/0169254 | A1* | 8/2005 | Kurita et al. | 370/352 |
| 2008/0285578 | A1* | 11/2008 | DeLay et al. | 370/412 |
| 2009/0138577 | A1* | 5/2009 | Casado et al. | 709/220 |

FOREIGN PATENT DOCUMENTS

| JP | 2003-174473 A | 6/2003 |
| JP | 2004-064490 A | 2/2004 |
| JP | 2004-129156 A | 4/2004 |
| JP | 2005-064882 A | 3/2005 |

OTHER PUBLICATIONS

Nikhil Handigol, et al., "Plug-n-Serve: Load-Balancing Web Traffic using Openflow", ACM SIGCOMM, 2009, (http://conferences.sigcomm.org/sigcomm/2009/demos/sigcom-m-pd-2009-final26.pdf).
"Security Kyoka no Tameno IPS Kanzen Guide", Network Magazine, vol. 9, No. 11, Nov. 1, 2004, pp. 25-32, Particularly, Fig. 2.
International Search Report dated Nov. 16, 2010 for PCT/JP2010/068504.

* cited by examiner

*Primary Examiner* — Dustin Nguyen
(74) *Attorney, Agent, or Firm* — McGinn IP Law Group, PLLC

(57) ABSTRACT

In a network system, each server is assigned to at least one relay processing devices. A plurality of switches are arranged in a network and a controller controls the switches. Specifically, the controller designs, in response to a request from a request source switch, a route of a flow from the request source switch to a destination address. Here, the controller refers to assignment information indicating an assignment relationship between servers and relay processing devices to select, as a target, any one relay processing device assigned to a server specified by the destination address, and designs the route so as to include the target. Then, the controller instructs each switch on the designed route to set the flow table such that a packet is forwarded along the designed route.

20 Claims, 15 Drawing Sheets

TBL: FLOW TABLE

| INPUT PORT | Header | OUTPUT PORT | Action |
|---|---|---|---|
|  |  |  |  |
|  |  |  |  |
|  |  |  |  |
|  |  |  |  |

Fig. 6

ASN:ASSIGNMENT INFORMATION

| RELAY PROCESSING DEVICE | SERVER |
|---|---|
|  |  |
|  |  |
|  |  |
|  |  |

IP=20.1.1.1

ASN: ASSIGNMENT INFORMATION

| RELAY PROCESSING DEVICE | SERVER | |
|---|---|---|
| LB1 | SV1-1 | IP=20.1.1.1 |
| | SV1-2 | |
| | ⋮ | |
| | SV1-20 | |
| LB2 | SV2-1 | IP=20.1.1.1 |
| | SV2-2 | |
| | ⋮ | |
| | SV2-10 | |
| | SV3 | |

ASN:ASSIGNMENT INFORMATION

| RELAY PROCESSING DEVICE | SERVER | |
|---|---|---|
| FW1 (IP=20.1.1.2) | SV1-1 | IP=20.1.2.101 |
| | SV1-2 | IP=20.1.2.102 |
| | ⋮ | ⋮ |
| | SV1-20 | IP=20.1.2.120 |
| FW2 (IP=20.1.1.2) | SV2-1 | IP=20.1.2.201 |
| | SV2-2 | IP=20.1.2.202 |
| | ⋮ | ⋮ |
| | SV2-10 | IP=20.1.2.210 |
| | SV3 | IP=20.1.3.1 |

NETWORK SYSTEM, CONTROL METHOD FOR THE SAME, AND CONTROLLER, USING TARGETED RELAY PROCESSING DEVICES

CROSS-REFERENCE TO RELATED APPLICATION

This is a continuation of International Application No. PCT/JP2010/068504, filed on Oct. 20, 2010.

TECHNICAL FIELD

The present invention relates to a network system and a control method for the same.

BACKGROUND ART

Regarding a network system, load balancing is one of important issues. For example, regarding a nonstructural network such as an enterprise network, a technique described in Non-Patent Literature 1 achieves comprehensive load balancing by considering a network congestion state and a server load state.

Patent Literature 1 (Japanese Patent Publication JP-2005-64882) discloses a higher-order layer processing system. In the higher-order layer processing system, a plurality of higher-order layer processing devices are arranged in parallel in order to secure scalability of the system. In order to equally use resources of the higher-order layer processing devices, a packet distribution device is provided at a former stage of the higher-order layer processing devices. The packet distribution device distributes packets to the plurality of higher-order layer processing devices on the basis of information of L3 or lower of a received packet. More specifically, the packet distribution device incorporates a hash into the received packet and sends the packet to the higher-order layer processing device. The higher-order layer processing device receives the packet and, if there is a possibility that the device itself becomes the congestion state, informs the packet distribution device accordingly. In this case, the packet distribution device selects another higher-order layer processing device. As a result, load centralization to a particular higher-order layer processing device can be prevented.

CITATION LIST

Patent Literature

Patent Literature 1: Japanese Patent Publication JP-2005-64882

Non Patent Literature

Non-Patent literature 1: Nikhil Handigol et al., "Plug-n-Serve: Load-Balancing Web Traffic using OpenFlow", ACM SIGCOMM, 2009, (http://conferences.sigcomm.org/sigcomm/2009/demos/sigcomm-pd-2009-final26.pdf)

SUMMARY OF INVENTION

According to the above-mentioned technique described in the Patent Literature 1, the packet distribution device is provided at a former stage of the plurality of higher-order layer processing devices, and thereby load centralization to a particular high-order layer processing device can be suppressed. In this case, however, the packet distribution device itself becomes a bottleneck. Therefore, it is desirable to secure scalability of the packet distribution device itself.

By way of generalization, not only the packet distribution device but also a device such as a load balancer (load balancing device) and a fire wall will be hereinafter referred to as a "relay processing device". An object of the present invention is to easily secure scalability of the relay processing device in a network system.

In an aspect of the present invention, a network system is provided. The network system has: a plurality of servers connected to a network; a plurality of relay processing devices connected to the network; a plurality of switches arranged in the network; and a controller configured to control the plurality of switches. Each of the plurality of servers is assigned to at least one of the plurality of relay processing devices. Each of the plurality of relay processing devices performs predetermined processing with respect to a packet to a server assigned to the each relay processing device. Each of the plurality of switches has a flow table indicating a correspondence relationship between an input source and a forwarding destination of a packet with respect to each flow and forwards a packet received from the input source to the forwarding destination by reference to the flow table. The controller has a memory unit, a route design unit and a switch setup unit. Information stored in the memory unit includes: network configuration information which indicates a connection state between the plurality of servers, the plurality of relay processing devices and the plurality of switches; and assignment information which indicates an assignment relationship between the plurality of servers and the plurality of relay processing devices. The route design unit designs, in response to a request from a request source switch among the plurality of switches, a route of a flow from the request source switch to a destination address. Specifically, the route design unit refers to the assignment information to select, as a target, any one relay processing device assigned to a server specified by the destination address. Then, the route design unit refers to the network configuration information to design the route so as to include the target. The switch setup unit instructs each switch on the designed route to set the flow table such that a packet of the flow is forwarded along the designed route.

In another aspect of the present invention, a controller that controls a plurality of switches arranged in a network is provided. A plurality of servers and a plurality of relay processing devices are connected to the network. Each of the plurality of servers is assigned to at least one of the plurality of relay processing devices. Each of the plurality of relay processing devices performs predetermined processing with respect to a packet to a server assigned to the each relay processing device. Each of the plurality of switches has a flow table indicating a correspondence relationship between an input source and a forwarding destination of a packet with respect to each flow and forwards a packet received from the input source to the forwarding destination by reference to the flow table. The controller has a memory unit, a route design unit and a switch setup unit. Information stored in the memory unit includes: network configuration information which indicates a connection state between the plurality of servers, the plurality of relay processing devices and the plurality of switches; and assignment information which indicates an assignment relationship between the plurality of servers and the plurality of relay processing devices. The route design unit designs, in response to a request from a request source switch among the plurality of switches, a route of a flow from the request source switch to a destination address. Specifically, the route design unit refers to the assignment information to select, as a target, any one relay processing device assigned to a server specified by the destination address. Then, the route design unit refers to the network configuration information to design the route so as to include the target. The switch setup unit instructs each switch on the designed route to set the flow table such that a packet of the flow is forwarded along the designed route.

In still another aspect of the present invention, a control method for a network system is provided. The network system has: a plurality of servers connected to a network; a plurality of relay processing devices connected to the network; and a plurality of switches arranged in the network. Each of the plurality of servers is assigned to at least one of the plurality of relay processing devices. Each of the plurality of relay processing devices performs predetermined processing with respect to a packet to a server assigned to the each relay processing device. Each of the plurality of switches has a flow table indicating a correspondence relationship between an input source and a forwarding destination of a packet with respect to each flow and forwards a packet received from the input source to the forwarding destination by reference to the flow table. The control method includes: (A) a step of designing, in response to a request from a request source switch among the plurality of switches, a route of a flow from the request source switch to a destination address; and (B) a step of instructing each switch on the designed route to set the flow table such that a packet of the flow is forwarded along the designed route. The (A) step of designing the route includes: (A1) a step of reading network configuration information and assignment information from a memory device, wherein: the network configuration information indicates a connection state between the plurality of servers, the plurality of relay processing devices and the plurality of switches; and the assignment information indicates an assignment relationship between the plurality of servers and the plurality of relay processing devices; (A2) a step of selecting, as a target, any one relay processing device assigned to a server specified by the destination address, by reference to the assignment information; and (A3) a step of designing the route so as to include the target, by reference to the network configuration information.

According to the present invention, it is possible to easily secure scalability of the relay processing device in a network system.

BRIEF DESCRIPTION OF DRAWINGS

The above and other objects, advantages and features of the present invention will be more apparent from the following description of certain exemplary embodiments taken in conjunction with the accompanying drawings.

FIG. 6 is a schematic diagram showing assignment information in the exemplary embodiment of the present invention.

DESCRIPTION OF EMBODIMENTS

Exemplary embodiments of the present invention will be described below with reference to the attached drawings.

1. NETWORK SYSTEM

Figure 1:
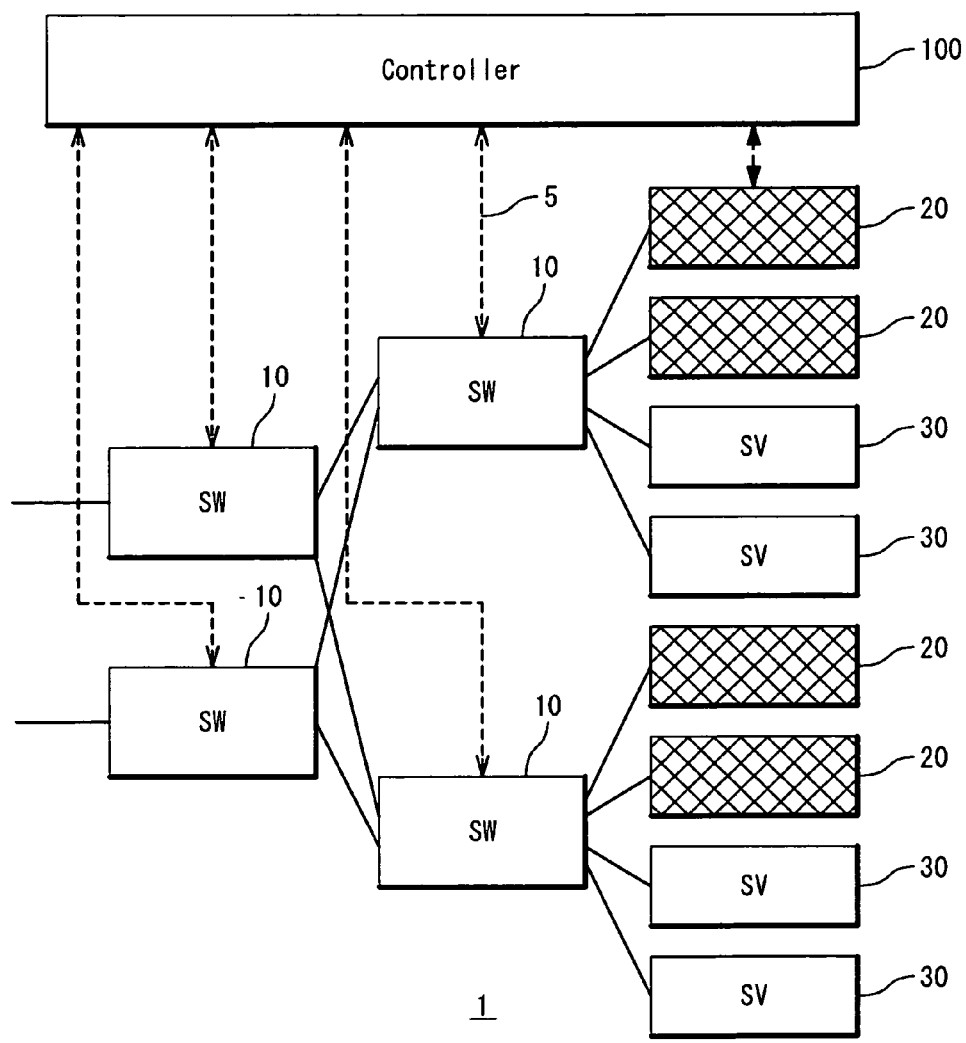
FIG. 1 is a block diagram showing a configuration example of a network system according to an exemplary embodiment of the present invention.

FIG. 1 is a block diagram showing a configuration example of a network system 1 according to an exemplary embodiment. The network system 1 has a plurality of switches 10, a plurality of relay processing devices 20, a plurality of servers 30 and a controller 100.

The relay processing devices 20 and the servers 30 are connected to a network through the switches 10. The relay processing device 20 is a dedicated device for handling a flow addressed to the server 30. The relay processing device 20 is exemplified by a network appliance such as a load balancer (load balancing device) and a fire wall. The network appliance is achieved by a dedicated hardware or by implementing software in a general-purpose server. Alternatively, the network appliance may be achieved by implementing software in a virtual machine on a general-purpose server (which is called a virtual appliance).

In the present exemplary embodiment, the plurality of relay processing devices 20 are provided in order to secure scalability of the relay processing device 20. Moreover, the plurality of relay processing devices 20 and the plurality of servers 30 are associated with each other. Each of the servers 30 is assigned to at least one of the plurality of relay processing devices 20, and each of the relay processing devices 20 is assigned to at least one of the plurality of servers 30. Each relay processing device 20 performs a predetermined processing (processing as a load balancer, processing as a fire wall, or the like) with respect to a packet of a flow to the server 30 assigned to the each relay processing device 20.

It should be noted that the relay processing devices 20 and the servers 30 are managed by management devices (not shown), respectively. In response to a request from the controller 100, the respective management devices notify the controller 100 of such information as identification information of the relay processing devices 20 and the servers 30.

The plurality of switches 10 are arranged in the network in a distributed manner. The switches 10 are connected by links (lines) to each other, and thus a switch network is configured by the plurality of switches 10. The switch network lies between an external network and the relay processing devices 20 and the servers 30 and between the relay processing devices 20 and the servers 30. Each of the switches 10 has a function of forwarding a received packet to a designated forwarding destination. It is the controller 100 that performs the designation. The controller 100 is connected to the switches 10 through control links 5 and has a function of controlling each switch 10 through the control link 5.

Figures 2, 3:
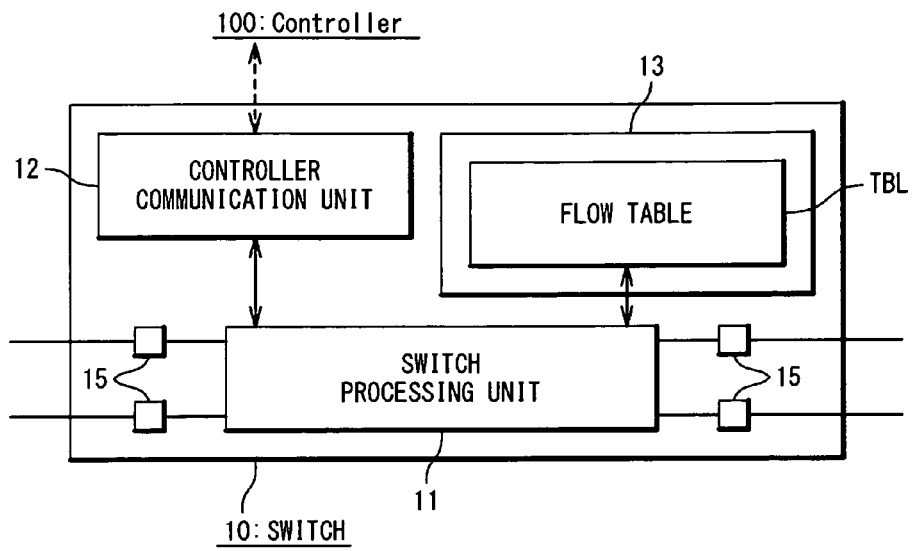
FIG. 2 is a block diagram showing a configuration example of a switch according to the exemplary embodiment of the present invention.
FIG. 3 is a schematic diagram showing a flow table in the exemplary embodiment of the present invention.

FIG. 2 shows a configuration example of the switch 10. The switch 10 has a switch processing unit 11, a controller communication unit 12, a memory unit 13 and a plurality of ports 15. A port 15 to which a packet is inputted from the outside is an input port, and a port 15 from which a packet is outputted to the outside is an output port. The switch processing unit 11 carries out major processing of the switch such as packet forwarding from the input port to the output port. The controller communication unit 12 is connected to the controller 100 through the control link 5 and communicates with the controller 100.

A flow table (forwarding table) TBL is stored in the memory unit 13. The flow table TBL indicates a correspondence relationship between an input source (input port) and a forwarding destination (output port) of a packet with respect to each flow. By referring to the flow table TBL stored in the memory unit 13, the switch processing unit 11 can forward a packet received from the input port to the designated output port. The details are as follows.

FIG. 3 is a schematic diagram showing the flow table TBL. The flow table TBL has entries that are different for each flow. A single entry indicates a correspondence relationship between the input port, header information, the output port and an action. The header information is information that can be obtained from a packet header, and is exemplified by a destination MAC address, a source MAC address, a destination IP address, a source IP address and the like. The flow can be identified by using the header information. The action indicates contents of processing (forwarding, deleting etc.) with respect to the received packet.

Figure 4:
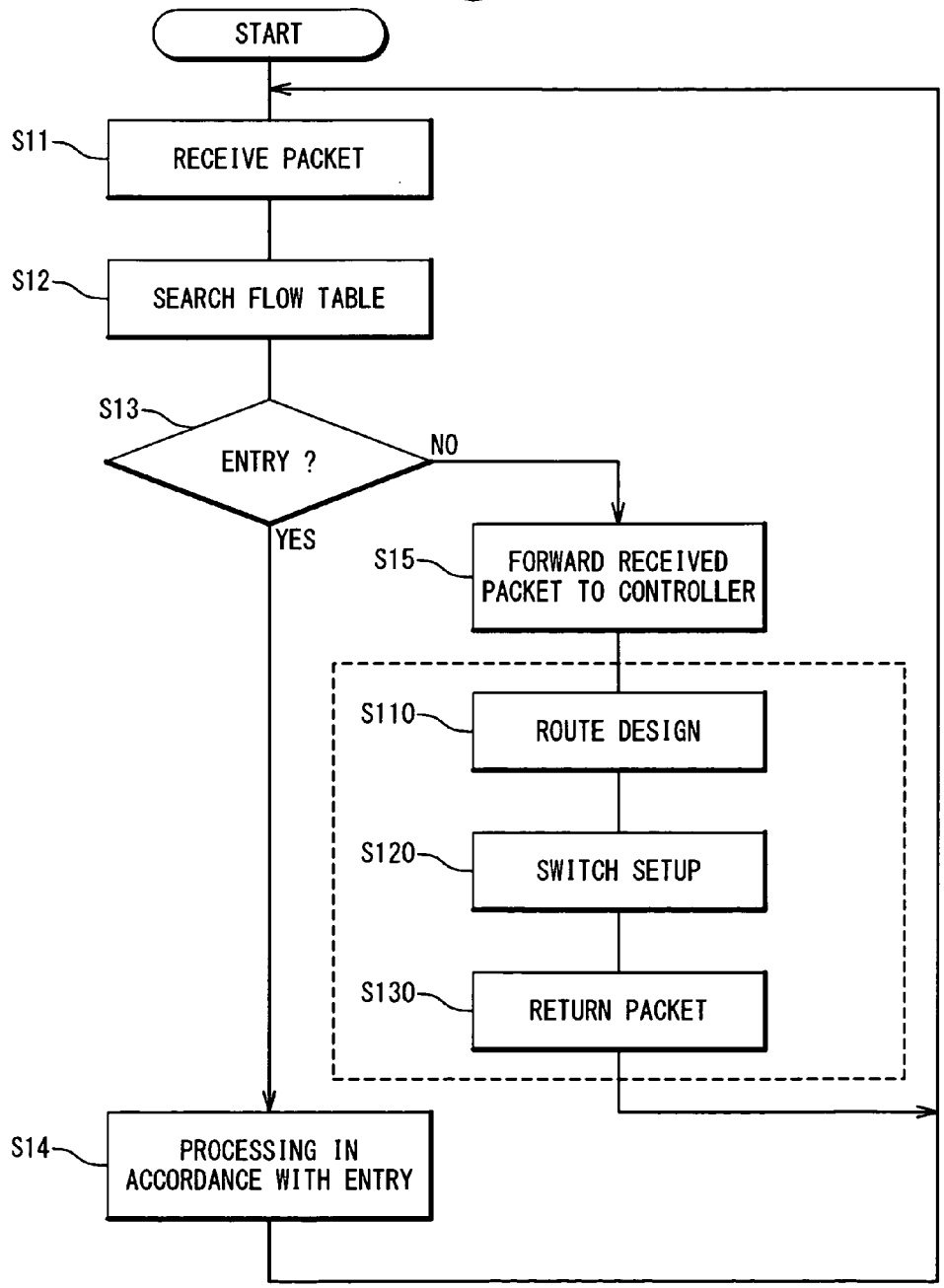
FIG. 4 is a flowchart showing an operation of the network system according to the exemplary embodiment of the present invention.

FIG. 4 is a flowchart showing an operation of the network system 1 according to the present exemplary embodiment. The switch 10 receives a packet of a certain flow (Step S11). More specifically, the switch processing unit 11 receives the packet through the input port. When receiving the packet from the input port, the switch processing unit 11 extracts the header information of the received packet. Then, the switch processing unit 11 uses the extracted header information and the input port as a search key to carry out a search on the flow table TBL (Step S12). If there exists an entry that matches the search key (Step S13; Yes), the switch processing unit 11 executes the action indicated by the entry (Step S14). Typically, the switch processing unit 11 outputs the received packet to the output port indicated by the entry.

On the other hand, if there is no entry that matches the search key in the flow table TBL (Step S13; No), it means that the switch 10 has firstly received a packet of the flow. In this case, the switch processing unit 11 requests the controller 100 to set up a transfer route of packets of the flow. More specifically, the switch processing unit 11 transmits the received packet (or the header information of the received packet) to the controller 100 through the controller communication unit 12 (Step S15). The switch 10 that transmits the route setting request to the controller 100 is hereinafter referred to as a "request source switch".

The controller 100 receives the route setting request (packet or header information) from the request source switch. In response to the route setting request, the controller 100 designs a route of the flow (Step S110). More specifically, the controller 100 extracts a destination address of the packet from the route setting request, and designs (determines) a route from the request source switch to the destination address. Here, the controller 100 according to the present exemplary embodiment selects an optimum one out of the plurality of relay processing devices 20, and designs the flow route so as to pass the optimum relay processing device 20. The details will be described below (refer to a Second Section).

Next, the controller 100 instructs the switches 10 (including the request source switch) on the designed route to achieve a flow communication along the designed route (Step S120). More specifically, the controller 100 instructs each switch 10 on the designed route to reflect the designed route in the flow table TBL. That is, the controller 100 instructs each switch 10 on the designed route to set the flow table TBL such that the packet of the flow is forwarded along the designed route. In response to the instruction, each switch 10 on the designed route adds an entry associated with the flow to its own flow table TBL.

After the setting of the flow table TBL is completed, the controller 100 sends the received packet back to the request source switch (Step S130). After that, each switch 10 on the designed route, when receiving a packet of the flow, can forward the received packet along the designated route.

In this manner, the controller 100 determines a flow route and controls the switches 10 in the network such that communication along the flow route can be achieved. That is, the controller 100 can appropriately control the network communication by controlling the switches 10. As an interface between the controller 100 and the switches 10 for achieving the processing described above, Openflow (refer to http://www.openflowswitch.org/) is applicable, for example. In this case, an "Openflow Controller" serves as the controller 100 and an "Openflow Switch" serves as each switch 10. It is possible to set up the flow table TBL of each switch 10 by using "Secure Channel" of the Openflow.

It should be noted that the network system 1 according to the present exemplary embodiment is applied, for example, to a data center. In the data center, a group of servers is usually stored in a rack. In a case of a single tenant, the servers in the rack or virtual machines in the server all belong to the same tenant. However, in a case of multi-tenant, a plurality of tenant environments can exist in a rack. In this case, virtual networks are multiplexed on a physical network by a network virtualization technique such as ULAN. Also, in each individual virtual network, the relay processing devices and the servers are connected and managed.

2. CONTROLLER 2-1. Configuration

Figure 5A:
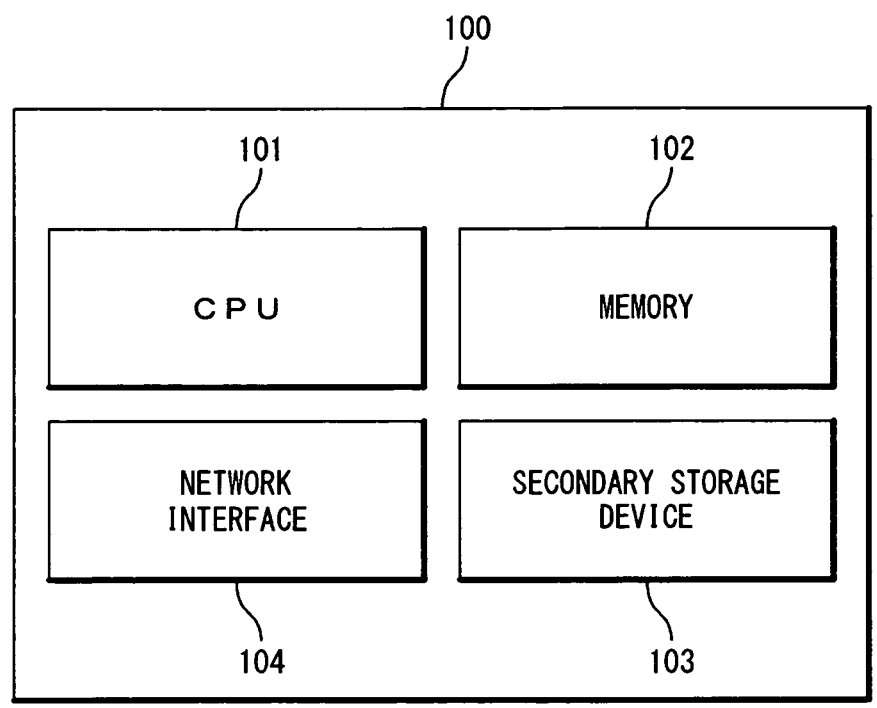
FIG. 5A is a block diagram showing a hardware configuration example of a controller according to the exemplary embodiment of the present invention.

Next, the controller 100 according to the present exemplary embodiment will be described in detail. FIG. 5A is a block diagram showing a hardware configuration example of the controller 100. The controller 100 is a computer having a CPU (Central Processing Unit) 101, a memory 102, a secondary storage device 103, a network interface 104 and the like.

Figure 5B:
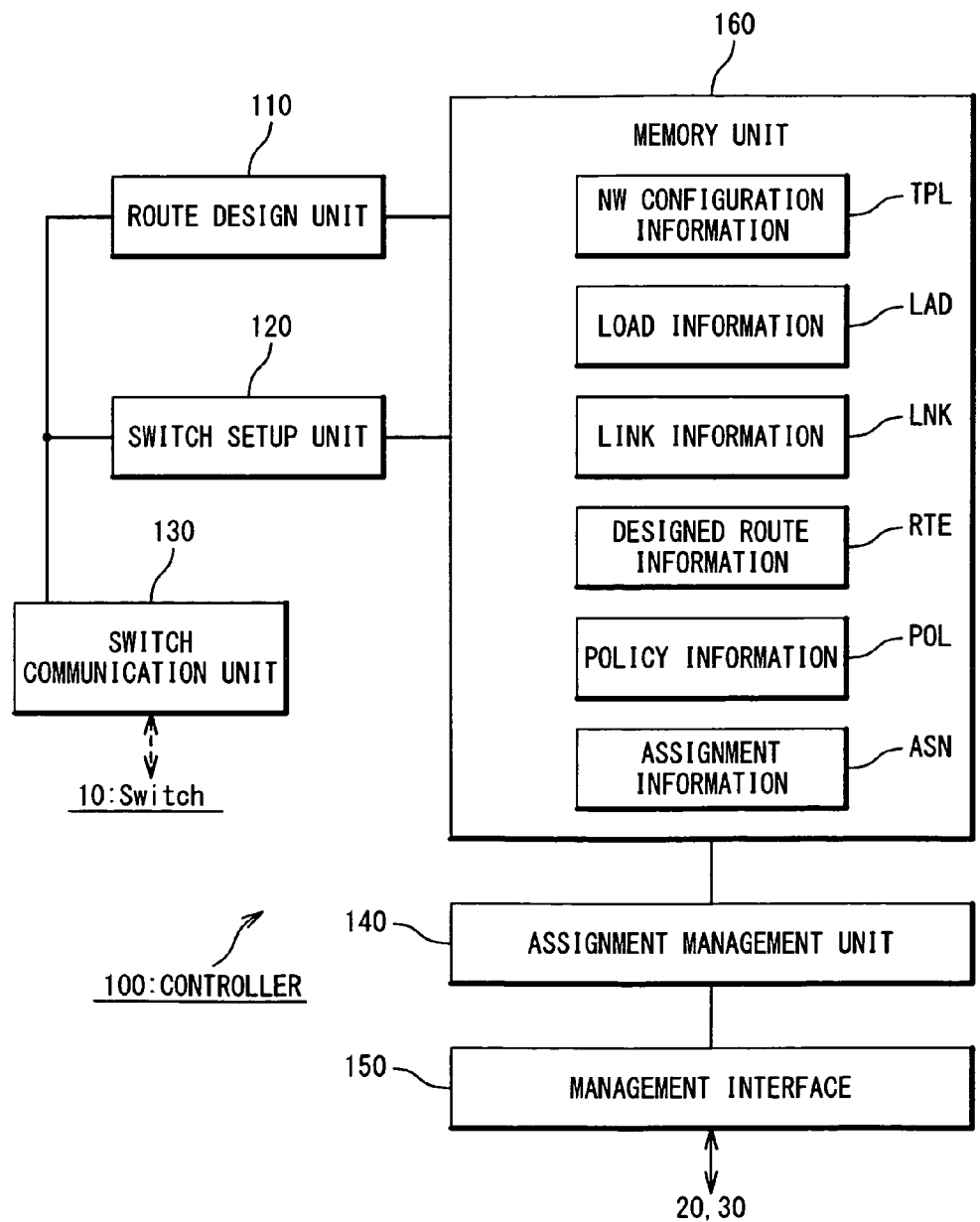
FIG. 5B is a functional block diagram showing a functional configuration of the controller according to the exemplary embodiment of the present invention.

FIG. 5B is a functional block diagram showing a functional configuration of the controller 100. The controller 100 has a route design unit 110, a switch setup unit 120, a switch communication unit 130, an assignment management unit 140, a management interface 150 and a memory unit 160.

The route design unit 110 carries out the above-mentioned Step S110 (route designing). The switch setup unit 120 carries out the above-mentioned Step S120 (switch setting). The switch communication unit 130 is connected to each switch 10 through the control link 5 and communicates with each switch 10. The assignment management unit 140 carries out assignment management processing (Steps S140, S150, S160 and S170) which will be described later. The management interface 150 communicates with the management devices for the relay processing devices 20 and the servers 30. The switch communication unit 130 and the management interface 150 correspond to the network interface 104 in FIG. 5A. The route design unit 110, the switch setup unit 120, the assignment management unit 140 and the like are achieved by the CPU 101 executing a computer program. The computer programs may be recorded on a computer-readable recording medium.

The memory unit 160 is a memory device such as a RAM (Random Access Memory) and an HDD (Hard Disk Drive), and corresponds to the memory 102 and the secondary storage device 103 in FIG. 5A. In the memory unit 160, such information as network configuration information TPL, load information LAD, link information LNK, designed route information RTE, policy information POL and assignment information ASN are stored.

The network configuration information TPL indicates a physical configuration and a logical configuration of the network. That is, the network configuration information TPL indicates a connection state (topology) between the plurality of servers 30, the plurality of relay processing devices 20 and the plurality of switches 10. For example, the network configuration information TPL indicates: to which port 15 of which switch 10 each server 30 is connected to; to which port 15 of which switch 10 each relay processing devices 20 is connected to; and the like.

The load information LAD indicates respective loads of the relay processing devices 20. The load of each relay processing device 20 is measured by the each relay processing device 20. The controller 100 obtains information regarding the measured load through the management device for the relay processing device 20.

The link information LNK indicates a state of the link (line) in the network. The link state includes a link capacity (communications capacity) and a congestion state. The link capacity is preliminarily determined. The congestion state is measured by each switch 10 and is notified to the controller 100. It should be noted that the link here includes not only a physical link but also a virtual link configured by dividing the physical link. In this case, the communications capacity between the switches is defined by a bandwidth of the virtual link.

The designed route information RTE, which is information created as a result of Step S110, indicates a transfer route of packets of a flow.

The policy information POL indicates a policy of the relay processing device 20 (load balancer, fire wall). The policy information POL is used for policy setting in the relay processing device 20.

The assignment information ASN indicates an assignment relationship between the plurality of servers 30 and the plurality of relay processing devices 20. Each server 30 is assigned to at least one of the plurality of relay processing devices 20, and each relay processing device 20 is assigned to at least one of the plurality of servers 30. FIG. 6 is a schematic diagram showing the assignment information ASN. For example, the assignment information ASN indicates: identification information of each relay processing devices 20; and identification information and the IP address of the server 30 assigned to the each relay processing devices 20.

2-2. Route Designing (Step S110) and Switch Setting (Step S120)

Figure 7:
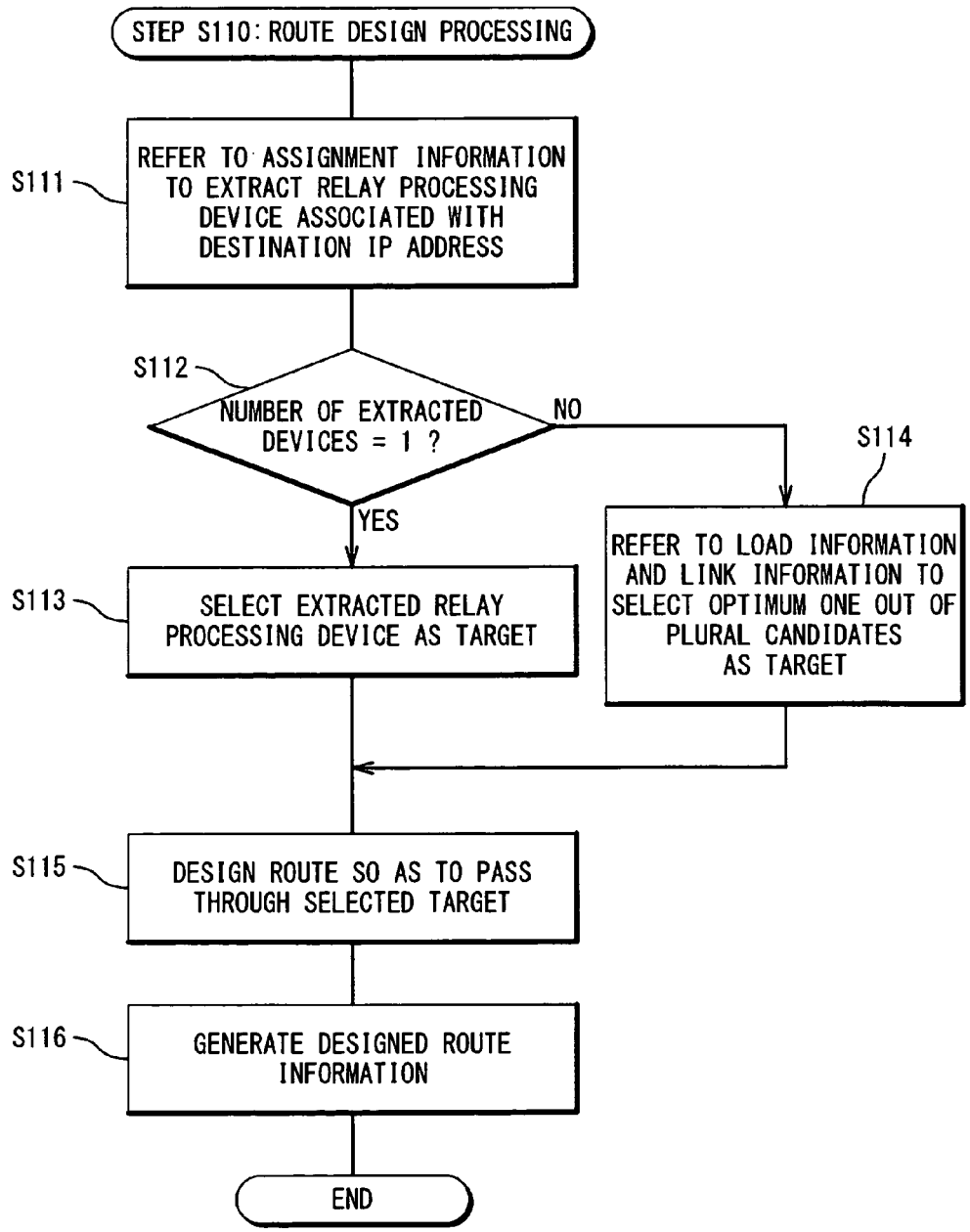
FIG. 7 is a flowchart showing processing in Step S110 (route designing) in the exemplary embodiment of the present invention.

In Step S110, the route design unit 110 receives a route setting request (packet or header information) from a request source switch. In response to the route setting request, the route design unit 110 designs a route of the flow from the request source switch to the destination. Referring to a flowchart shown in FIG. 7, Step S110 in the present exemplary embodiment will be described in detail below.

Step S111:
The route design unit 110 extracts a destination IP address of the packet from the received route setting request. Subsequently, the route design unit 110 refers to the above-mentioned assignment information ASN stored in the memory unit 160 to extract the relay processing device 20 associated with the destination IP address. That is, by referring to the assignment information ASN, the route design unit 110 extracts the relay processing device 20 assigned to a server specified by the destination IP address.

Step S113:
In a case where the number of the extracted device is 1, that is, in a case where the destination IP address is assigned to only one relay processing device 20 (Step S112; Yes), the route design unit 110 selects the one relay processing device 20 as a "target".

Step S114:
In a case where the number of the extracted device is plural, that is, in a case where the destination IP address is assigned to two or more relay processing devices 20 (Step S112; No), the route design unit 110 selects any one of those relay processing devices 20 as a "target". On the target selection, the route design unit 110 considers communication efficiency and load balancing regarding the relay processing devices 20. For that purpose, the route design unit 110 refers to the link information LNK and/or the load information LAD stored in the memory unit 160. Then, the route design unit 110 selects, as the target, an optimum one relay processing devices 20 from the viewpoint communication efficiency and load balancing.

Step S115:
The route design unit 110 refers to the network configuration information TPL to design a packet transfer route from the request source switch to the destination address. Here, the route design unit 110 designs (determines) the route so as to pass the above-mentioned selected target.

Step S116:
The route design unit 110 creates designed route information RTE indicating the designed route, and stores the designed route information RTE in the memory unit 160.

After that, the switch setup unit 120 executes Step S120 by reference to the designed route information RTE stored in the memory unit 160. More specifically, the switch setup unit 120 instructs each switch 10 on the designed route to set up the flow table TBL such that the packet of the flow is forwarded along the designed route. In response to the instruction, each switch 10 on the designed route adds an entry associated with the flow to its own flow table TBL.

As described above, according to the present exemplary embodiment, the plurality of relay processing devices 20 are provided in order to secure the scalability of the relay processing device 20. Moreover, the plurality of switches 10 are provided at a former stage of the plurality of relay processing devices 20. The controller 100 selects, as a target, an appropriate one depending on the destination from the plurality of relay processing devices 20, and designs a route so as to pass the target. Then, the controller 100 controls the switches 10 provided at the former stage of the relay processing device 20 such that packets are transferred along the designed route. This means that distribution of flows to the plurality of relay processing devices 20 is achieved by the switches 10 and the controller 100. Therefore, it is possible to easily scale-out the relay processing devices 20 depending on the situation. In this manner, according to the present exemplary embodiment, it is possible to easily secure the scalability of the relay processing devices 20.

2-3. Assignment Management

For example, if the server 30 or the relay processing device 20 is newly added, the network configuration will change. In response to such a change in the network configuration, the assignment management unit 140 of the controller 100 updates the assignment information ASN.

(Step S140: Addition of Server)

Figure 8:
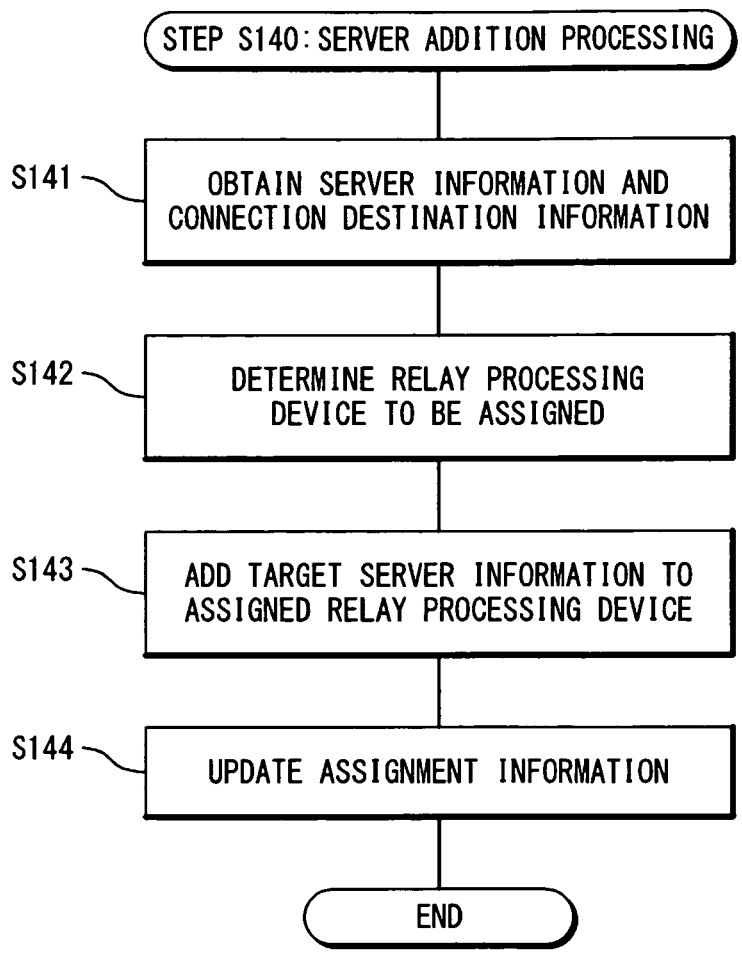
FIG. 8 is a flowchart showing processing in Step S140 in the exemplary embodiment of the present invention.

Processing (Step S140) in a case where a new server is added to the network will be described with reference to FIG. 8. Typically, a new server is added in order to scale-out the servers in the network system.

Step S141:

The assignment management unit 140 obtains new server information from the management device for the server 30 or from a setting information file of the server 30. Moreover, the assignment management unit 140 performs server search processing and the like to obtain connection destination information of the new server (to which port of which switch the new server is connected).

Step S142:

The assignment management unit 140 determines a relay processing device 20 that treats the new server, based on the network configuration information TPL (logical network connection relationship), the connection destination information and the new server information. Here, the assignment management unit 140 selects the relay processing device 20 having functions required for the new server. For example, in a case where a load balancer is required for the new server, the assignment management unit 140 selects the relay processing device 20 having a load balancer function.

Step S143:

The assignment management unit 140 registers the new server information on the relay processing device 20 selected in Step S142. The new server information may be registered on the plurality of relay processing devices 20. In the case where the relay processing device 20 is a load balancer, the new server information is added to a load balance group. In the case where the relay processing device 20 is a fire wall, it is not necessary to explicitly register the latter stage server information on the fire wall, but information of a server to which a packet will be forwarded through the relay processing device is retained in the controller 100.

Step S144:

The assignment management unit 140 updates the assignment information ASN.

(Step S150: Deletion of Server)

Figure 9:
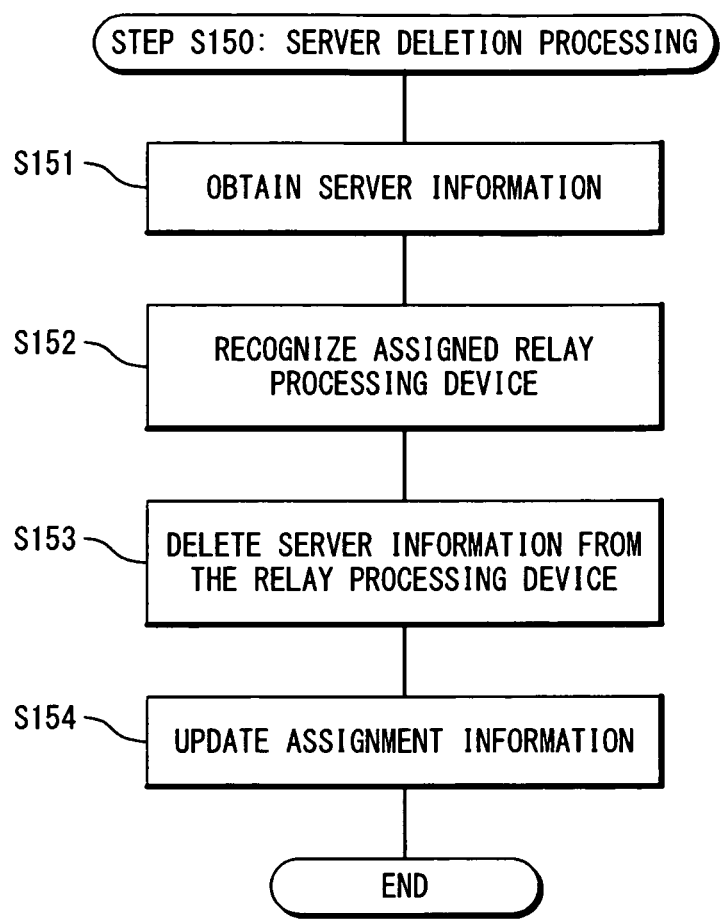
FIG. 9 is a flowchart showing processing in Step S150 in the exemplary embodiment of the present invention.

Processing (Step S150) in a case where a server is deleted from the registration will be described with reference to FIG. 9. Typically, a server is deleted when performance of servers becomes sufficient.

Step S151:

The assignment management unit 140 obtains deletion server information from the management device for the server 30 or from a setting information file of the server 30.

Step S152:

Referring to the assignment information ASN, the assignment management 140 recognizes the relay processing device 20 assigned to the deletion server.

Step S153:

The assignment management unit 140 deletes the server information from the relay processing device 20 obtained in Step S152.

Step S154:

The assignment management unit 140 updates the assignment information ASN.

(Step S160: Addition of Relay Processing Device)

Figure 10:
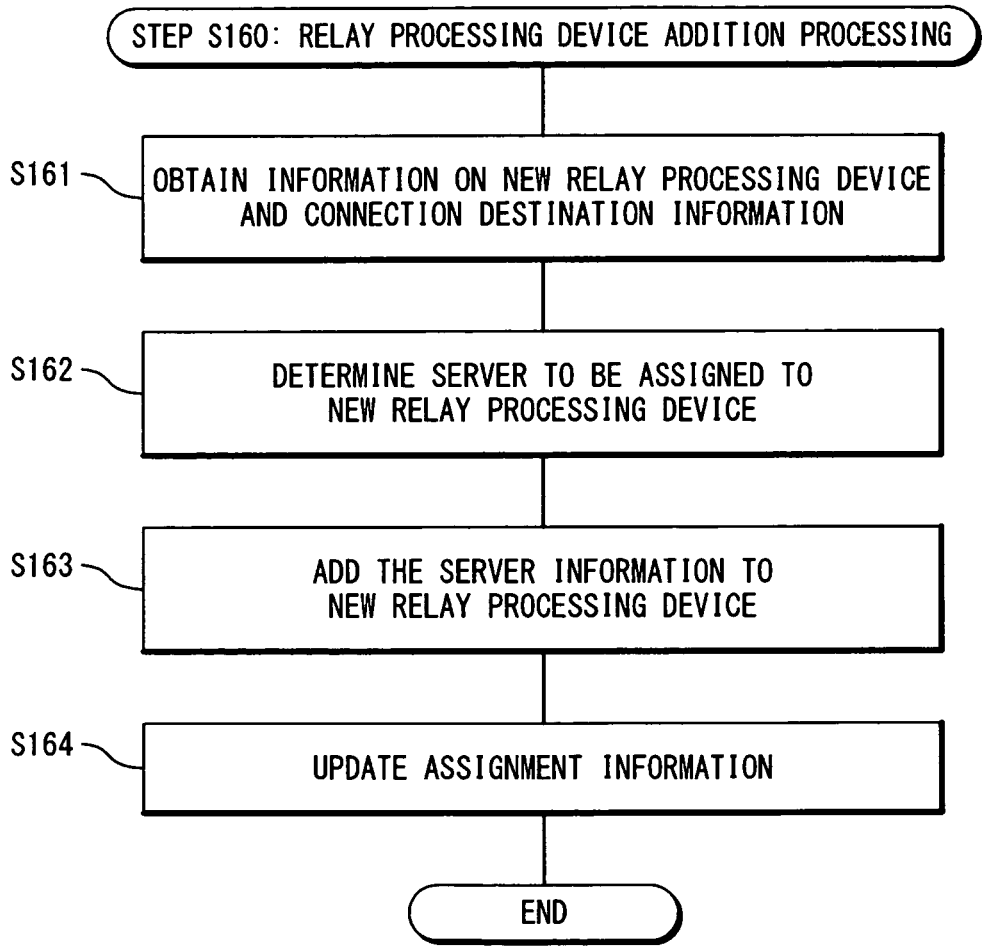
FIG. 10 is a flowchart showing processing in Step S160 in the exemplary embodiment of the present invention.

Processing (Step S160) in a case where a new relay processing device is added will be described with reference to FIG. 10. Typically, a new relay processing device is added when performance of the relay processing devices 20 becomes deficient or when the relay route to the server 30 is congested.

Step S161:

The assignment management unit 140 obtains the identification information (e.g. function, address and the like) and the connection destination information (e.g. to which port of which switch it is connected) of the new relay processing device from the management device for the relay processing device 20 or from a setting information file of the relay processing device 20.

Step S162:

Based on the identification and the connection destination information of the new relay processing device, the assignment management unit 140 selects a server to be assigned to the new relay processing device from the servers having been assigned to the existing relay processing devices 20.

Step S163:

The assignment management unit 140 registers server information of the server selected in Step S162 on the new relay processing device.

Step S164:

The assignment management unit 140 updates the assignment information ASN.

(Step S170: Change in Number of Assigned Server)

Figure 11:
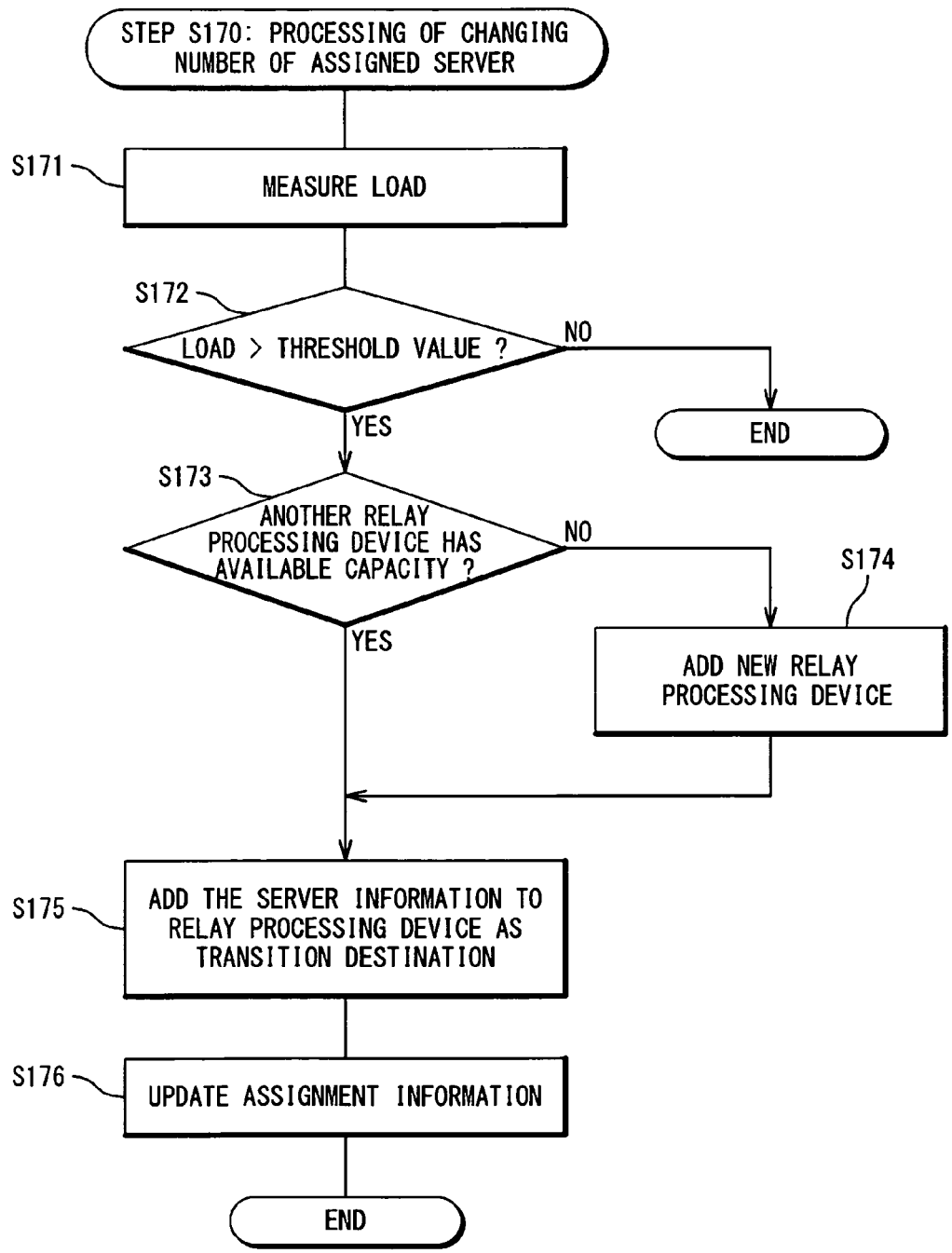
FIG. 11 is a flowchart showing processing in Step S170 in the exemplary embodiment of the present invention.

Processing (Step S170) in a case where the number of servers assigned to the relay processing device 20 is changed will be described with reference to FIG. 11.

Step S171:

The relay processing device 20 measures its own load and notifies the measured load to the controller 100 through the management device. Alternatively, a load information collection unit (not shown) of the controller 100 may collect the measured load information from each of the relay processing devices 20. The assignment management unit 140 stores the above-mentioned load information LAD indicating the loads of the respective relay processing devices 20 in the memory unit 160.

Step S172:

The assignment management unit 140 refers to the load information LAD to compares the measured load of each relay processing device 20 with a predetermined threshold. If the measured load does not exceed the threshold value (Step S172; No), the processing is completed.

Step S173:

On the other hand, if the measured load of a certain relay processing device 20 (a relay processing device as a transition source) exceeds the threshold value (Step S172; Yes), the assignment management unit 140 checks whether or not another relay processing device 20 has available capacity. If there is another relay processing device 20 having available capacity (Step S173; Yes), the assignment management unit 140 determines the relay processing device 20 as a relay processing device as a transition destination.

Step S174:

On the other hand, if there is no relay processing device 20 having available capacity (Step S173; No), a new relay processing device is added in the same manner as in the case of the above-described Step S160. In this case, the assignment management unit 140 determines the new relay processing device as a relay processing device as a transition destination.

Step S175:

The assignment management unit 140 selects a server to be assigned to the relay processing device as the transition destination from the servers having been assigned to the relay processing device as the transition source. Then, the assignment management unit 140 deletes the server information of the selected server from the relay processing device as the transition source and registers it on the relay processing device as the transition destination.

Step S176:

The assignment management unit 140 updates the assignment information ASN. In this manner, the number of servers assigned to each relay processing device 20 can be increased or decreased depending on the load of the each relay processing device 20. Accordingly, it is possible to efficiently utilize resources of the relay processing devices 20.

3. CONCRETE EXAMPLES 3-1. First Example

Load Balancer

Figure 12:
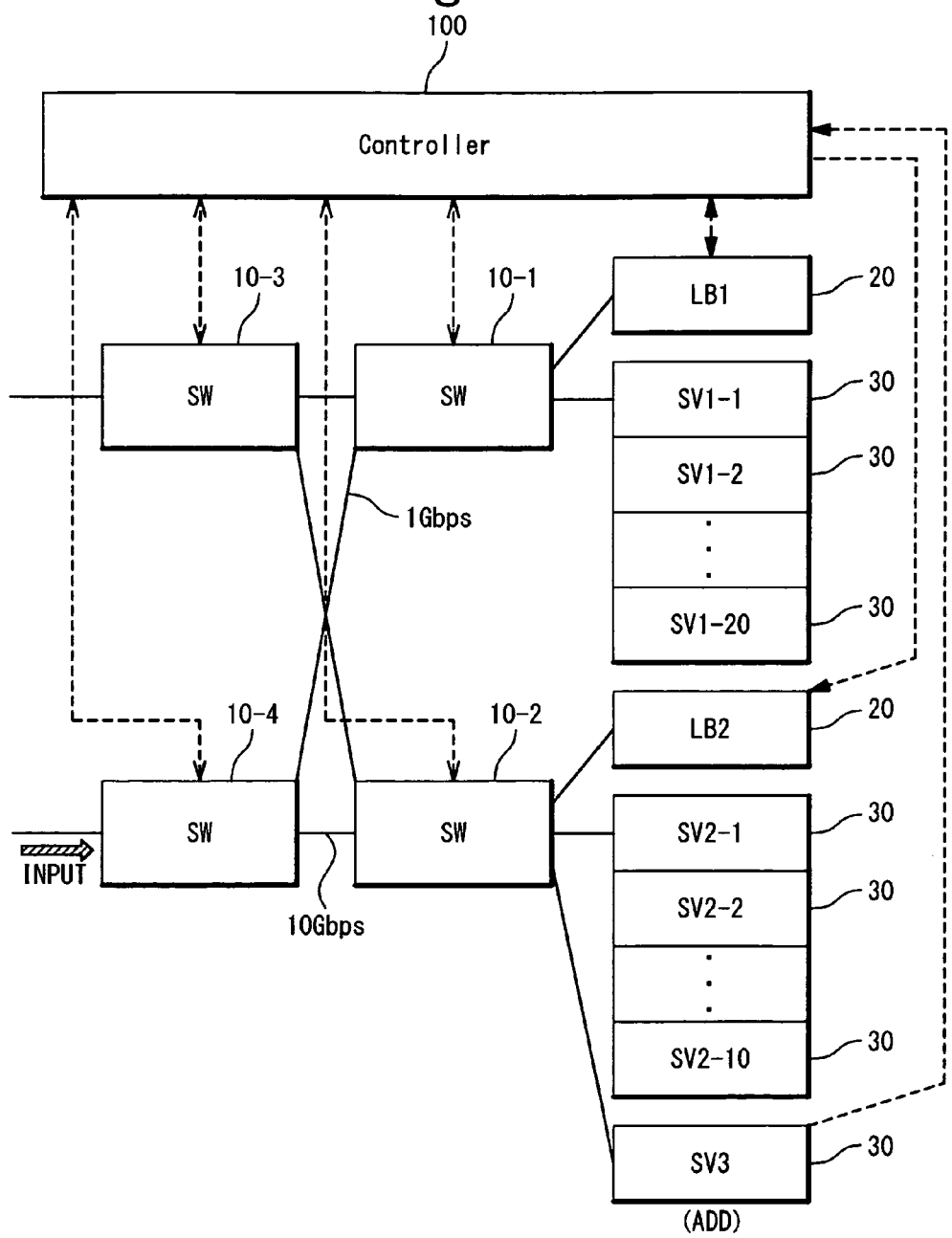
FIG. 12 shows a configuration of a network system in a first example.
Figures 13, 14:
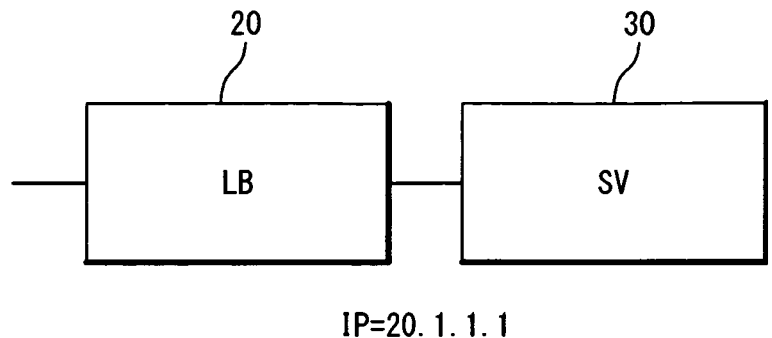
FIG. 13 shows a logical configuration of the network system in the first example.
FIG. 14 shows assignment information in the first example.

A first example of the present exemplary embodiment will be described with reference to FIGS. 12 to 14. FIG. 12 shows a configuration of the network system 1 in the first example. FIG. 13 shows a logical configuration of the network system 1 in the first example. FIG. 14 shows the assignment information ASN in the first example.

In the first example, the relay processing device 20 is a load balancer LB. As shown in FIG. 12, a first load balancer LB1 is connected to a switch 10-1, and a second load balancer LB2 is connected to a switch 10-2. Twenty servers SV1-1 to SV1-20 are assigned to the first load balancer LB1, and the first load balancer LB1 carries out the load balancing with regard to the servers SV1-1 to SV1-20. Ten servers SV2-1 to SV2-10 are assigned to the second balancer LB2, and the second load balancer LB2 carries out the load balancing with regard to the servers SV2-1 to SV2-10.

As shown in FIGS. 13 and 14, it is assumed that a virtual IP address of the server group handled by the load balancers LB1 and LB2 is common "20. 1. 1. 1". When receiving a packet whose destination IP address is "20. 1. 1. 1", each of the load balancers LB1 and LB2 selects one of the plurality of subordinate real servers 30 and distributes the received packet to the real server (the processing is possible in any real server). That is, the destination IP address is common among the plurality of servers SV, and the single destination IP address is associated with the two load balancers LB1 and LB2. This is equivalent to that each server SV is assigned to the two load balances LB1 and LB2.

Here, let us consider addition of a new server SV3 (Step S140). When a new server SV3 is additionally connected to the switch 10-2, the controller 100 obtains the server information and the connection destination information regarding the new server SV3 (Step S141). Next, referring to the network configuration including the new server SV3, the controller 100 incorporates the new server SV3 into under the second load balancer LB2 close to the switch 10-2 (Step S142). Subsequently, the controller 100 adds the server information of the new server SV3 to the load balance group of the second load balancer LB2 (Step S143). Then, the controller 100 updates the assignment information ASN as shown in FIG. 14 (Step S144).

It should be noted that the new server SV3 may be registered also on the first load balancer LB1 in parallel with a small weight. In this case, most of the traffic using the server SV3 is handled by the second load balancer LB2; however, it is also possible to select the server SV3 when the servers SV1-1 to SV1-20 under the first load balancer LB1 are overloaded.

Let us consider a case where the switch 10-4 (refer to FIG. 12) firstly receives a packet of "destination IP address=20. 1. 1. 1". That is, let us consider a case where the switch 10-4 is the request source switch. In this case, the request source switch 10-4 sends a route setting request (packet or header information) to the controller 100.

The route design unit 110 extracts "destination IP address=20. 1. 1. 1" from the received route setting request. Moreover, referring to the assignment information ASN shown in FIG. 14, the route design unit 110 extracts the two load balancers LB1 and LB2 associated with "destination IP address=20. 1. 1. 1" (Step S111, Step S112; No).

In this case, the route design unit 110 selects any one of the two load balancers LB1 and LB2 as a target, in consideration of the communication efficiency and the load balancing (Step S114). For example, as shown in FIG. 12, let us consider a case where the link capacity between the switch 10-1 to which the first load balancer LB1 is connected and the request source switch 10-4 is 1 Gbps and the link capacity between the switch 10-2 to which the second load balancer LB2 is connected and the request source switch 10-4 is 10 Gbps. The route design unit 110 selects the second load balancer LB2 as the target, on the basis of the network configuration information TPL and the link information LNK.

The route design unit 110 designs a packet transfer route from the request source switch 10-4 to the destination IP address (Step S115). Here, the route design unit 110 determines the route so as to pass the second load balancer LB2. After that, the switch setup unit 120 instructs each of the switches 10-4 and 10-2 on the designed route to set up the flow table TBL such that the packet of the flow is forwarded along the designed route (Step S120). In response to the instruction, each of the switches 10-4 and 10-2 on the designed route adds an entry regarding the flow to its own flow table TBL. The second load balancer LB2 performs the load distribution processing with respect to the subordinate server SV2-1 to 2-10 and SV3.

3-2. Second Example

Fire Wall

Figure 15:
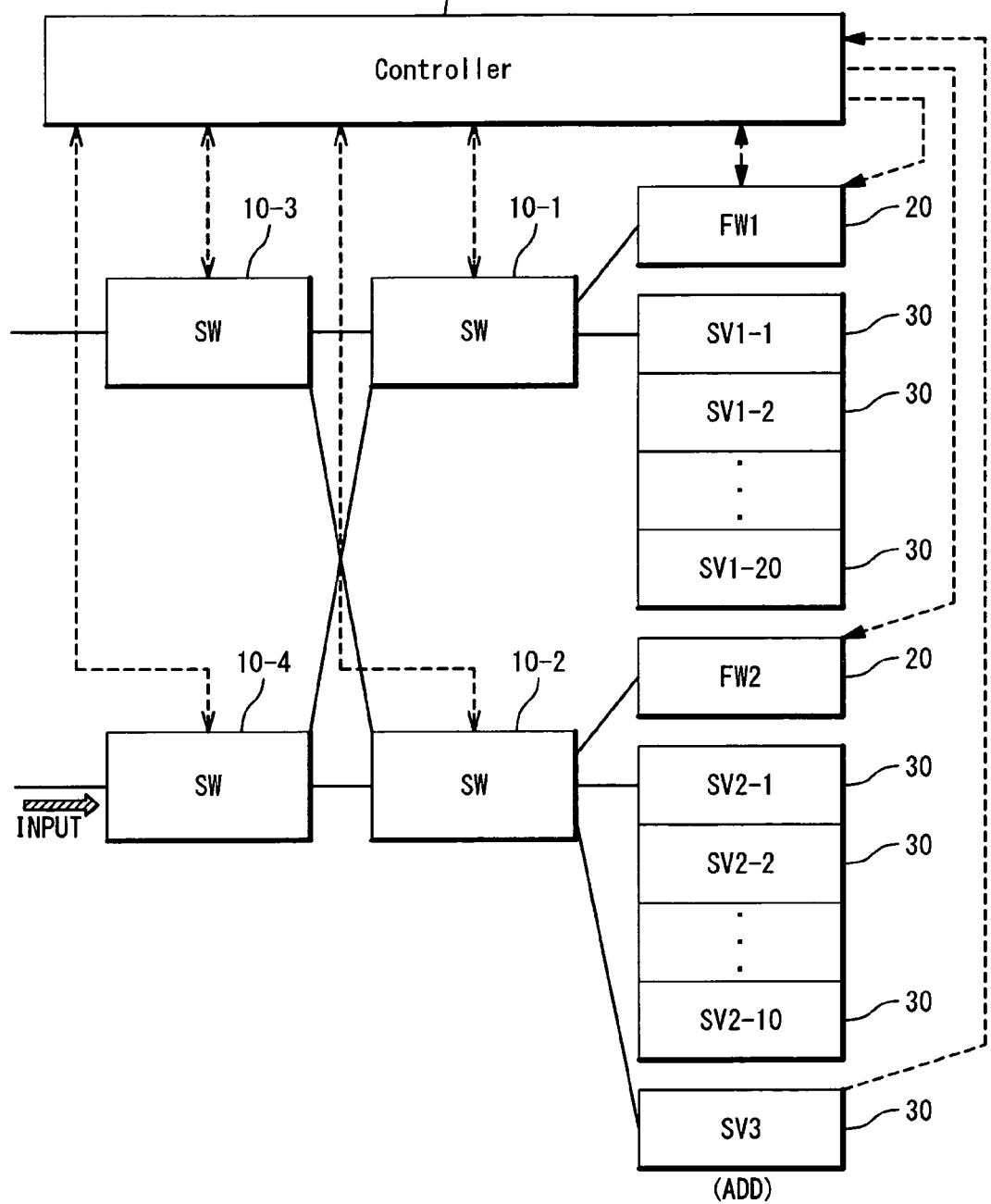
FIG. 15 shows a configuration of a network system in a second example.
Figures 16, 17:
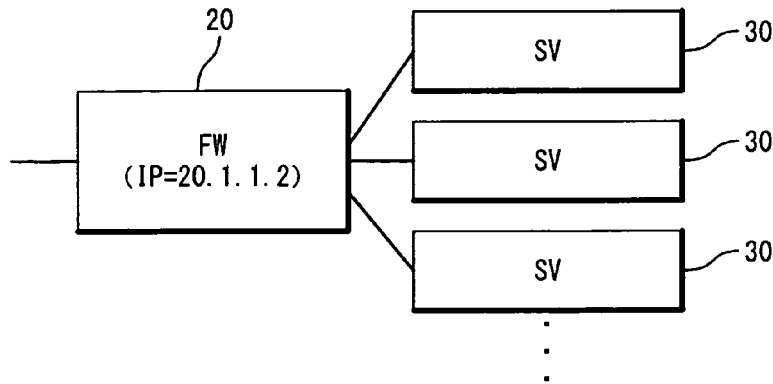
FIG. 16 shows a logical configuration of the network system in the second example.
FIG. 17 shows assignment information in the second example.

A second example of the present exemplary embodiment will be described with reference to FIGS. 15 to 17. FIG. 15 shows a configuration of the network system 1 in the second example. FIG. 16 shows a logical configuration of the network system 1 in the second example. FIG. 17 shows the assignment information ASN in the second example.

In the second example, the relay processing device 20 is a fire wall FW. The fire wall FW relays packets to the individual destination server 30. As shown in FIG. 15, the first fire wall FW1 is connected to the switch 10-1, and the second fire wall FW 2 is connected to the switch 10-2. Twenty servers SV1-1 to SV1-20 are assigned to the first fire wall FW1, and the first fire wall FW1 relays packets to the servers SV1-1 to SV1-20. Ten servers SV2-1 to SV2-10 are assigned to the second fire wall FW2, and the second fire wall FW2 relays packets to the servers SV2-1 to SV2-10.

As shown in FIGS. 16 and 17, the IP address of each of the fire walls FW1 and FW2 is "20. 1. 1. 2". Each of the fire walls FW1 and FW2 receives a packet in which "IP address=20. 1. 1. 2" is designated as a next hop, and after carrying out a filter processing in accordance with a fire wall policy, forwards the packet to the individual servers 30 designated by the destination IP address. It should be noted that the fire wall policy is set in each of the fire walls FW1 and FW2 by the controller 100 in accordance with the policy information POL.

Here, let us consider addition of a new server SV3 (Step S140). When the new server SV3 is additionally connected to the switch 10-2, the controller 100 obtains the server information and the connection destination information regarding the new server SV3 (Step S141). Next, referring to the network configuration including the new server SV3, the controller 100 incorporates the new server SV3 into under the second fire wall FW2 close to the switch 10-2 (Step S142). Then, the controller 100 updates the assignment information ASN as shown in FIG. 17 (Step S144). It should be noted that connection to the server SV3 is also possible from the first fire wall FW1. Most of the traffic using the server SV3 is connected from the second fire wall FW2; however, it is also possible to connect to the server SV3 through the first fire wall FW1 when the second fire wall FW2 is overloaded.

Let us consider a case where the switch 10-4 (refer to FIG. 15) firstly receives a packet of "destination IP address=20. 1. 3. 1". That is, let us consider a case where the switch 10-4 is the request source switch. Here, the request source switch 10-4 sends a route setting request (packet or header information) to the controller 100.

The route design unit 110 extracts "destination IP address=20. 1. 3. 1" from the received route setting request. Moreover, referring to the assignment information ASN shown in FIG. 17, the route design unit 110 extracts the second fire wall FW2 associated with "destination IP address=20. 1. 3. 1" (Step Sill, Step S112; Yes). In this case, the route design unit 110 selects the second fire wall FW2 as the target (Step S113).

The route design unit 110 designs a packet transfer route from the request source switch 10-4 to the destination IP address (Step S115). Here, the route design unit 110 determines the route so as to pass the second fire wall FW2. After that, the switch setup unit 120 instructs each of the switches 10-4 and 10-2 on the designed route to set up the flow table TBL such that the packet of the flow is forwarded along the designed route (Step S120). In response to the instruction, each of the switches 10-4 and 10-2 on the designed route adds an entry regarding the flow to its own flow table TBL. The second fire wall FW2 relays packets to the server SV3 designated by the destination IP address.

While the exemplary embodiments of the present invention have been described above with reference to the attached drawings, the present invention is not limited to these exemplary embodiments and can be modified as appropriate by those skilled in the art without departing from the spirit and scope of the present invention.

This application is based upon and claims the benefit of priority from Japanese patent application No. 2009-244872, filed on Oct. 23, 2009, the disclosure of which is incorporated herein in its entirely by reference.

The invention claimed is:

1. A network system comprising:
a plurality of servers connected to a network;
a plurality of relay processing devices connected to said network;
a plurality of switches arranged in said network; and
a controller configured to control said plurality of switches, wherein:
  each of said plurality of servers is assigned to at least one of said plurality of relay processing devices;
  each of said plurality of relay processing devices performs predetermined processing with respect to a packet to a server assigned to said each relay processing device; and
  each of said plurality of switches has a flow table indicating a correspondence relationship between an input source and a forwarding destination of a packet with respect to each flow and forwards a packet received from said input source to said forwarding destination by reference to said flow table,
wherein said controller comprises:
  a memory unit;
  a route design unit configured to design, in response to a request from a request source switch among said plurality of switches, a route of a flow from said request source switch to a destination address; and
  a switch setup unit configured to instruct each switch on said designed route to set said flow table such that a packet of the flow is forwarded along said designed route,
wherein information stored in said memory unit comprises:
  network configuration information which indicates a connection state between said plurality of servers, said plurality of relay processing devices and said plurality of switches; and
  assignment information which indicates an assignment relationship between said plurality of servers and said plurality of relay processing devices,
wherein said route design unit refers to said assignment information to select, as a target, any one relay processing device assigned to a server specified by said destination address, and said route design unit refers to said network configuration information to design said route so as to include said target.

2. The network system according to claim 1, wherein the server specified by said destination address is assigned to two or more relay processing devices among said plurality of relay processing devices, and
said route design unit selects any one of said two or more relay processing devices as said target.

3. The network system according to claim 2, wherein the information stored in said memory unit further comprises:
load information which indicates respective loads of said plurality of relay processing devices; and
link information which indicates states of links in said network,
wherein said route design unit refers to at least one of said load information and said link information to select an optimum one of said two or more relay processing devices as said target.

4. The network system according to claim 2, wherein at least one of said relay processing device comprises a load balancer.

5. The network system according to claim 1, wherein the server specified by said destination address is assigned to one relay processing device among said plurality of relay processing devices, and said route design unit selects said one relay processing device as said target.

6. The network system according to claim 5, wherein at least one of said relay processing device comprises a fire wall.

7. The network system according to claim 1, wherein said controller further comprises an assignment management unit configured to update said assignment information in response to addition of a server or a relay processing device.

8. A controller that controls a plurality of switches arranged in a network wherein:
- a plurality of servers and a plurality of relay processing devices are connected to said network;
- each of said plurality of servers is assigned to at least one of said plurality of relay processing devices;
- each of said plurality of relay processing devices performs predetermined processing with respect to a packet to a server assigned to said each relay processing device; and
- each of said plurality of switches has a flow table indicating a correspondence relationship between an input source and a forwarding destination of a packet with respect to each flow and forwards a packet received from said input source to said forwarding destination by reference to said flow table, said controller comprising:
- a memory unit;
- a route design unit configured to design, in response to a request from a request source switch among said plurality of switches, a route of a flow from said request source switch to a destination address; and
- a switch setup unit configured to instruct each switch on said designed route to set said flow table such that a packet of the flow is forwarded along said designed route, wherein information stored in said memory unit comprises:
- network configuration information which indicates a connection state between said plurality of servers, said plurality of relay processing devices and said plurality of switches; and
- assignment information which indicates an assignment relationship between said plurality of servers and said plurality of relay processing devices, wherein said route design unit refers to said assignment information to select, as a target, any one relay processing device assigned to a server specified by said destination address, and said route design unit refers to said network configuration information to design said route so as to include said target.

9. A control method for a network system, wherein said network system comprises:
- a plurality of servers connected to a network;
- a plurality of relay processing devices connected to said network; and
- a plurality of switches arranged in said network,
wherein:
  - each of said plurality of servers is assigned to at least one of said plurality of relay processing devices;
  - each of said plurality of relay processing devices performs predetermined processing with respect to a packet to a server assigned to said each relay processing device; and
  - each of said plurality of switches has a flow table indicating a correspondence relationship between an input source and a forwarding destination of a packet with respect to each flow and forwards a packet received from said input source to said forwarding destination by reference to said flow table, said control method comprising:
- designing, in response to a request from a request source switch among said plurality of switches, a route of a flow from said request source switch to a destination address; and
- instructing each switch on said designed route to set said flow table such that a packet of the flow is forwarded along said designed route, wherein the designing said route comprises:
- reading network configuration information and assignment information from a memory device,
wherein:
  - said network configuration information indicates a connection state between said plurality of servers, said plurality of relay processing devices and said plurality of switches; and
  - said assignment information indicates an assignment relationship between said plurality of servers and said plurality of relay processing devices;
- selecting, as a target, any one relay processing device assigned to a server specified by said destination address, by reference to said assignment information; and
- designing said route so as to include said target, by reference to said network configuration information.

10. The control method according to claim 9, wherein said selecting of one relay processing device as the target comprises:
- determining, from said assignment information, whether a potential relay processing device is a single relay processing device associated with the server specified by said destination address; and
- if so, using the potential relay processing device as the target that defines a route of flow from said request source switch to said destination address.

11. The control method according to claim 10, further comprising:
- if it is determined from said assignment information that more than one potential relay processing device is associated with the server specified by said destination address, referring to said assignment information for load information and link information associated with each potential relay processing device associated with the server; and
- using at least one of the load information and link information to select an optimum relay processing device as the target.

12. The control method according to claim 11, wherein the link information for a relay processing device comprises information of a state of a link in the network, the link state comprising at least one of a communication capacity and a congestion state.

13. The control method according to claim 9, wherein said selecting of one relay processing device as the target comprises determining, from said assignment information, whether a potential relay processing device is a single relay processing device associated with the server specified by said destination address.

14. The controller according to claim 13, wherein:
- if it is determined from said assignment information, that a potential relay processing device is a single relay processing device associated with the server specified by said destination address, using the potential relay processing device as the target that defines a route of flow from said request source switch to said destination address; and if it is determined from said assignment information that more than one potential relay processing device is associated with the server specified by said destination address, referring to said assignment information for load information and link information associated with each potential relay processing device associated with the server and using at least one of the load information and link information to select an optimum relay processing device as the target.

15. The controller according to claim 14, wherein the link information for a relay processing device comprises information of a state of a link in the network, the link state comprising at least one of a communication capacity and a congestion state.

16. The network system according to claim 1, wherein said selecting of one relay processing device as the target comprises:
  determining, from said assignment information, whether a potential relay processing device is a single relay processing device associated with the server specified by said destination address; and
  if so, using the potential relay processing device as the target that defines a route of flow from said request source switch to said destination address.

17. The network system according to claim 16, wherein:
  if it is determined from said assignment information that more than one potential relay processing device is associated with the server specified by said destination address, referring to said assignment information for load information and link information associated with each potential relay processing device associated with the server; and
  using at least one of the load information and link information to select an optimum relay processing device as the target.

18. The network system according to claim 17, wherein the link information for a relay processing device comprises information of a state of a link in the network, the link state comprising at least one of a communication capacity and a congestion state.

19. The network system according to claim 7, wherein said assignment management unit is configured to update said assignment information in response to deleting a server from the network system.

20. The network system according to claim 1, wherein said controller is configured to change said assignment relationship between said plurality of servers and said plurality of relay processing devices, as based upon determining whether a measured load of a relay processing device exceeds a predetermined threshold value.

* * * * *